May 25, 1954     A. W. STARDIG     2,679,276
COMBINE STRAW CUTTER

Filed Dec. 22, 1949     2 Sheets-Sheet 1

Inventor
Albert W. Stardig

May 25, 1954 A. W. STARDIG 2,679,276
COMBINE STRAW CUTTER
Filed Dec. 22, 1949 2 Sheets-Sheet 2

Inventor
Albert W. Stardig
By *Clarence A. O'Brien and Harvey B. Jacobson*
Attorneys Patented May 25, 1954

2,679,276

UNITED STATES PATENT OFFICE 2,679,276

COMBINE STRAW CUTTER

Albert W. Stardig, McIntosh, Minn.

Application December 22, 1949, Serial No. 134,500

3 Claims. (Cl. 146—164)

This invention comprises novel and useful improvements in straw cutting devices, and more particularly pertains to straw cutting attachments for combines, of the type taught by J. T. Fiese et al., No. 2,148,547.

In the Fiese et al. patent, rotary teeth carried the straw past stationary fingers thereby cutting the straw. If the straw or other material were cut by the rotary teeth, then the straw would merely hang on the stationary fingers. The applicant device has overcome this disadvantage and further utilizes the straw feeding mechanism to discharge the cut straw from the cutting attachment.

An important object of this invention is to provide a straw cutting device which will positively engage the straw, cut the same, and uniformly distribute the straw over the ground so that the straw is easy to plow under resulting in a good mulch.

Another important object of this invention is to provide a straw cutting device in accordance with the foregoing object, which is durable, compact and of simple construction, yet highly efficient for the purposes intended.

An important feature of this invention resides in forming a straw feeder which positively engages the straw, carries it past the cutters, and then uniformly distributes it over the ground.

Another important feature of this invention resides in the provision for a readily detachable bracket which supports the cutters and guides the straw.

Figure 1:
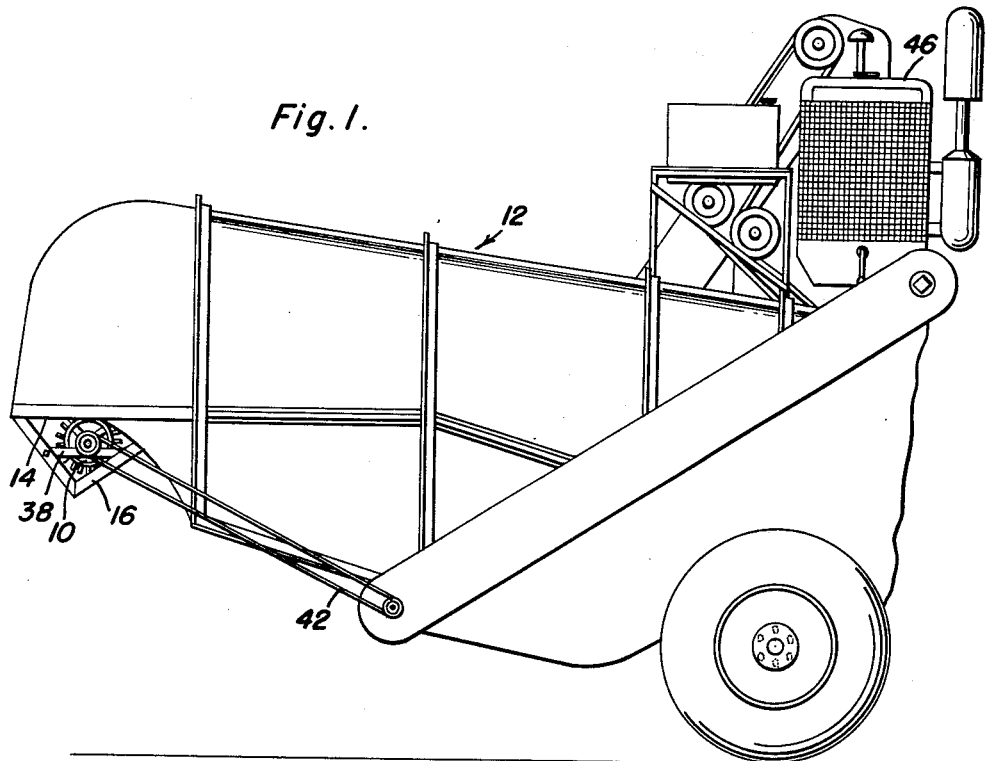
Figure 2:
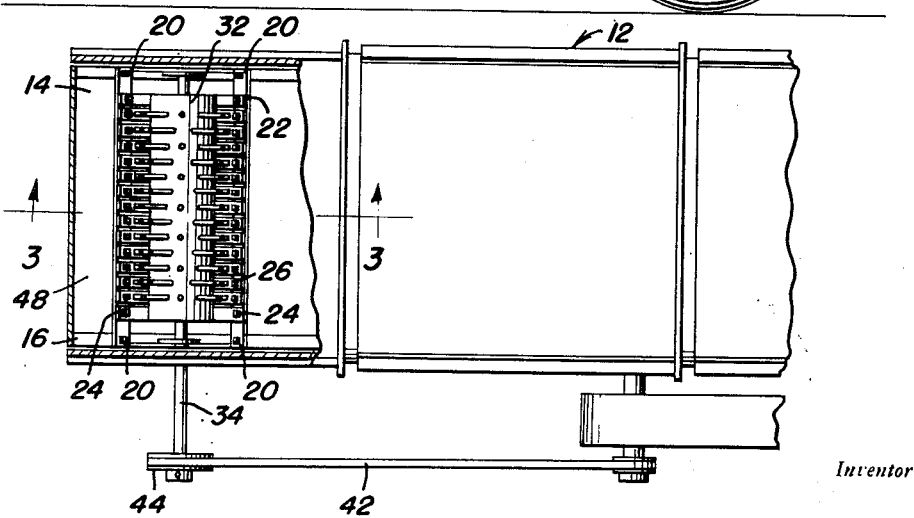
Figure 4:
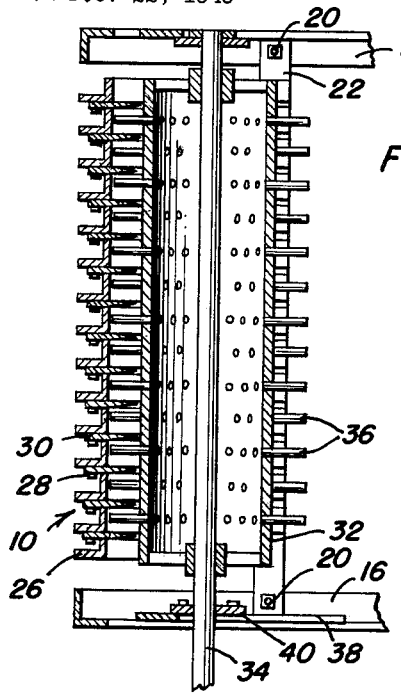
Figure 5:
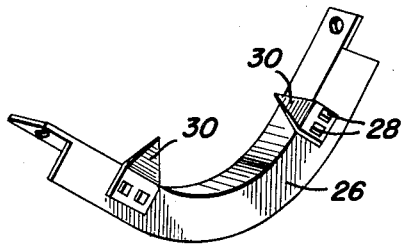
Figure 3:
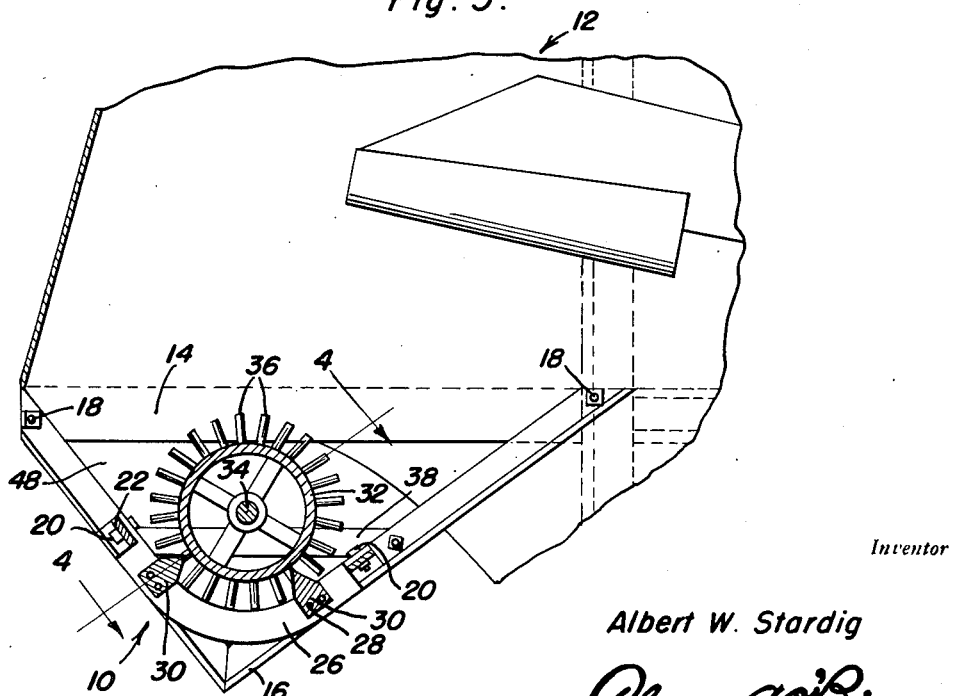

These, together with various ancillary objects and features are attained by this device, a preferred embodiment of which has been illustrated by way of example only in the accompanying drawings wherein:

Figure 1 is a fragmentary side elevational view of a combine with the straw macerating device attached to the straw outlet, Figure 2 is a fragmentary sectionalized top view of a combine with the straw macerating device attached, Figure 3 is an enlarged fragmentary sectionalized side view of the discharge outlet of a combine and showing details of the cutting device, taken substantially on the plane 3—3 of Figure 2, Figure 4 is a fragmentary sectional view of the cutting device taken substantially on the plane 4—4 of Figure 3, and Figure 5 is an enlarged perspective detail view of one of the straw guiding and cutter retaining members with the cutters attached.

Referring now to the accompanying drawings wherein like numerals designate similar parts throughout the various views, the straw cutting device indicated generally by the numeral 10 is adapted to be attached to a combine indicated generally by the numeral 12, preferably in the discharge chute 14 thereof.

The cutting device 10 is attached to the combine 12 by any suitable means such as the L-shaped brackets 16 which may be formed of angle iron or the like, and attached to the frame of the combine 12 by bolts 18 or rivets or the like.

Secured by fasteners 20, to the arms of L-shaped brackets 16, are straps 22 transverse to the longitudinal axis of the combine 12, the fasteners 20 being preferably removable in order to facilitate repairs to the cutting device 10. Detachably secured to the straps 22 by fasteners 24 are preferably arcuately shaped members 26 which are placed in sidewise alignment. These arcuately shaped members 26 may be formed of angle iron or the like and may be slightly laterally spaced from each other so as to permit short pieces of straw and the like to be discharged therebetween. Projecting upwardly and inwardly from the members 26, and secured thereto in any desired manner such as by rivets or bolts 28, are cutting knives 30.

A straw feeding device consisting of a drum 32 and fingers 36 is rotatably attached as by the axle 34 to the combine 10. For this purpose a bearing support 38 is secured to the arms of the L-shaped brackets 16, preferably so as to be vertically adjustable relative thereto, bearings 40 being mounted on the supports 38, the axle 34 being rotatably mounted in the bearings 40.

The fingers 36 are preferably radially disposed on the drum 32 in annular rows, the rows being so spaced that the fingers 36 will pass intermediate the adjacent rows of the knives 30 when the drum 32 is rotated. In order to facilitate smoother cutting action, the adjacent rows of fingers 36 may be offset or angularly displaced relative to each other. Obviously the fingers 36 may be removably attached to the drum 32 to facilitate repairs, as by screw threaded engagement thereto.

The drum 32 is operatively connected to the source of power 46 which drives the combine by a belt or chain 42 or the like, which is connected to a pulley 44 on the drum shaft 34, the drum 32 being rotated thereby.

In operation the straw is blown or otherwise transferred by the combine towards the outlet, where it is engaged by the fingers 36 of the cutting device 10. The drum, which is preferably rotated clockwise, positively engages the straw by means of the fingers 36 and passes it rearwardly over the knives 30, the arcuately shaped members 26 guiding the straw so that it remains in engagement with the fingers. Rearwardly, beyond the cutters 30, the arcuately shaped members 26 terminate, providing an aperture 48 through which the cut straw is discharged. Obviously the clockwise air currents caused by the rotating drum 32 will prevent straw which is blown or otherwise transferred by the combine 10 to the chute 14 from passing over the top of the drum through the aperture 48, thereby escaping the cutting process.

From the foregoing, it is believed that the construction and operation of the device will be readily understood, and further discussion is therefore believed to be unnecessary. However, since numerous modifications will readily occur to those skilled in the art after a consideration of the above specification and accompanying drawings, it is not intended to limit the invention to that shown and described, but all suitable modifications may be resorted to, falling within the scope of the appended claims.

Having described the invention, what is claimed as new is:

1. In a combine straw cutter having a discharge chute, brackets mounted on opposite sides of said chute adjacent the discharge opening thereof, bearing means on said brackets, a shaft journaled at its ends in said bearing means and extending between said brackets, a drum mounted on said shaft and axially spaced rows of radial fingers projecting from said drum, elongated elements connecting said brackets to one another, said elements being disposed on opposite sides of said drum beneath and parallel to the shaft, a plurality of arcuate members conforming to the curvature of said drum extending between and connected at their ends to said elongated elements, said members being spaced beneath said drum, upwardly projecting cutting blades on said arcuate members extending between the rows of fingers on said drum, said arcuate members having top surfaces parallel to the periphery of said drum and side flanges depending from one edge of each of said top surfaces, said cutting blades being mounted on said side flanges, an edge of each arcuate member abutting the cutting blades of the adjacent member to prevent lateral flexure of said blades.

2. In a combine straw cutter having a discharge chute, brackets mounted on opposite sides of said chute adjacent the discharge opening thereof, bearing means on said brackets, a shaft journaled at its ends in said bearing means and extending between said brackets, a drum mounted on said shaft and axially spaced rows of radial fingers projecting from said drum, elongated elements connecting said brackets to one another, said elements being disposed on opposite sides of said drum beneath and parallel to the shaft, a plurality of arcuate members conforming to the curvature of said drum extending between and connected at their ends to said elongated elements, said members being spaced beneath said drum, upwardly projecting cutting blades on said arcuate members extending between the rows of fingers on said drum, said arcuate members having top surfaces parallel to the periphery of said drum and side flanges depending from one edge of each of said top surfaces, said cutting blades being mounted on said side flanges, an edge of each arcuate member abutting the cutting blades of the adjacent member to prevent lateral flexure of said blades, the ends of said side flanges terminating short of the ends of the top surfaces of said arcuate members and abutting said elongated elements, the end portions of said top surfaces resting on said elongated elements, the distance between the periphery of said drum and the top surfaces of said arcuate members being approximately equal to the length of said fingers.

3. A combine straw cutter comrising a support, a straw feeding and distributing drum rotatably mounted on said support; a plurality of longitudinally arcuate angle members having first and second relatively perpendicular legs, means attaching said angle members in sidewise alignment with each other to said support concentrically of said drum in spaced relation thereto, said first leg of each of said angle members being parallel to the surface of said drum, the second leg of each of said angle members depending downwardly from one edge of said first leg perpendicularly to said drum surface, cutting blades attached to said second legs of each of said members and extending toward said drum, said first legs of said angle members presenting a uniformly smooth drum facing surface, radially projecting fingers on said drum arranged in axially spaced, circumferential rows, said blades projecting between the rows of said fingers, the edge of the top surface of each of said arcuate members abutting the cutting blades of the next adjacent arcuate member.

References Cited in the file of this patent

UNITED STATES PATENTS

| Number | Name | Date |
| --- | --- | --- |
| 61,424 | Haven | Jan. 22, 1867 |
| 563,006 | Barnes | June 30, 1896 |
| 834,378 | Gans et al. | Oct. 30, 1906 |
| 2,213,906 | Ebersol | Sept. 3, 1940 |
| 2,465,488 | Sears et al. | Mar. 29, 1949 |
| 2,539,136 | Hite | Jan. 23, 1951 |
| 2,611,407 | Alloway | Sept. 23, 1952 |

FOREIGN PATENTS

| Number | Country | Date |
| --- | --- | --- |
| 647,256 | France | July 24, 1928 |